United States Patent
Chamness et al.

(10) Patent No.: US 10,380,515 B1
(45) Date of Patent: Aug. 13, 2019

(54) GEOLOCATION FOR CUSTOMER SUPPORT MOBILE APPLICATION

(75) Inventors: Mark Chamness, Menlo Park, CA (US); Zhipeng Gong, San Jose, CA (US)

(73) Assignee: EMC IP Holding Company LLC, Hopkinton, MA (US)

(*) Notice: Subject to any disclaimer, the term of this patent is extended or adjusted under 35 U.S.C. 154(b) by 731 days.

(21) Appl. No.: 13/333,887

(22) Filed: Dec. 21, 2011

(51) Int. Cl.
*G06Q 10/06* (2012.01)

(52) U.S. Cl.
CPC .............. *G06Q 10/063112* (2013.01)

(58) Field of Classification Search
CPC .................. G06Q 30/0281; G06Q 10/047
See application file for complete search history.

(56) References Cited

U.S. PATENT DOCUMENTS

| | | | |
|---|---|---|---|
| 2006/0173724 A1* | 8/2006 | Trefler et al. | 705/8 |
| 2007/0021966 A1* | 1/2007 | Ellefson et al. | 705/1 |
| 2007/0130279 A1* | 6/2007 | Thacher | 709/208 |
| 2008/0270313 A1* | 10/2008 | Cullen et al. | 705/80 |
| 2010/0030810 A1* | 2/2010 | Marr | 707/104.1 |
| 2010/0136954 A1* | 6/2010 | Bennett, Jr. | 455/414.1 |
| 2010/0211669 A1* | 8/2010 | Dalgas et al. | 709/224 |
| 2012/0203586 A1* | 8/2012 | Blakely | 705/7.12 |
| 2012/0265696 A1* | 10/2012 | Tuchman et al. | 705/304 |
| 2012/0278408 A1* | 11/2012 | Seferian | G06Q 10/1095 709/206 |
| 2012/0310602 A1* | 12/2012 | Jacobi | G06F 17/5004 703/1 |

* cited by examiner

*Primary Examiner* — Deirdre D Hatcher
(74) *Attorney, Agent, or Firm* — Womble Bond Dickinson (US) LLP

(57) ABSTRACT

Retrieving information associated with a request for support is disclosed, including: receiving a request for customer support including geo-location data generated and included automatically in the request; and using the geo-location data to retrieve information associated with the request.

20 Claims, 9 Drawing Sheets

| Installed system identifier | Geo-location data | Customer site | Configurations |
|---|---|---|---|
| FD2349Af4h42M | N 28.132°, W 82.543° | World Inc – New York, USA | Start backup every night at midnight |
| LSB16LKd7m467 | N 65.743°, E 7.425° | World Inc – London, England | Start backup each week on Saturday at 1am |
| ... | ... | ... | ... |
| ... | ... | ... | ... |

FIG. 4

GEOLOCATION FOR CUSTOMER SUPPORT MOBILE APPLICATION

BACKGROUND OF THE INVENTION

Networked mobile devices are becoming more and more prevalent. Mobile device users have come to appreciate the convenience of being able to send and receive communication, look up questions online, and store useful information, among others, while enjoying the advantages of not being tethered to a stationary computer. In addition to the many native functionalities of mobile devices (e.g., camera, voice calls), mobile software applications have substantially broadened the capabilities and uses of such devices.

BRIEF DESCRIPTION OF THE DRAWINGS

Various embodiments of the invention are disclosed in the following detailed description and the accompanying drawings.

FIG. 4 is an example of entries at a database table storing installed system information.

DETAILED DESCRIPTION

Figure 1:
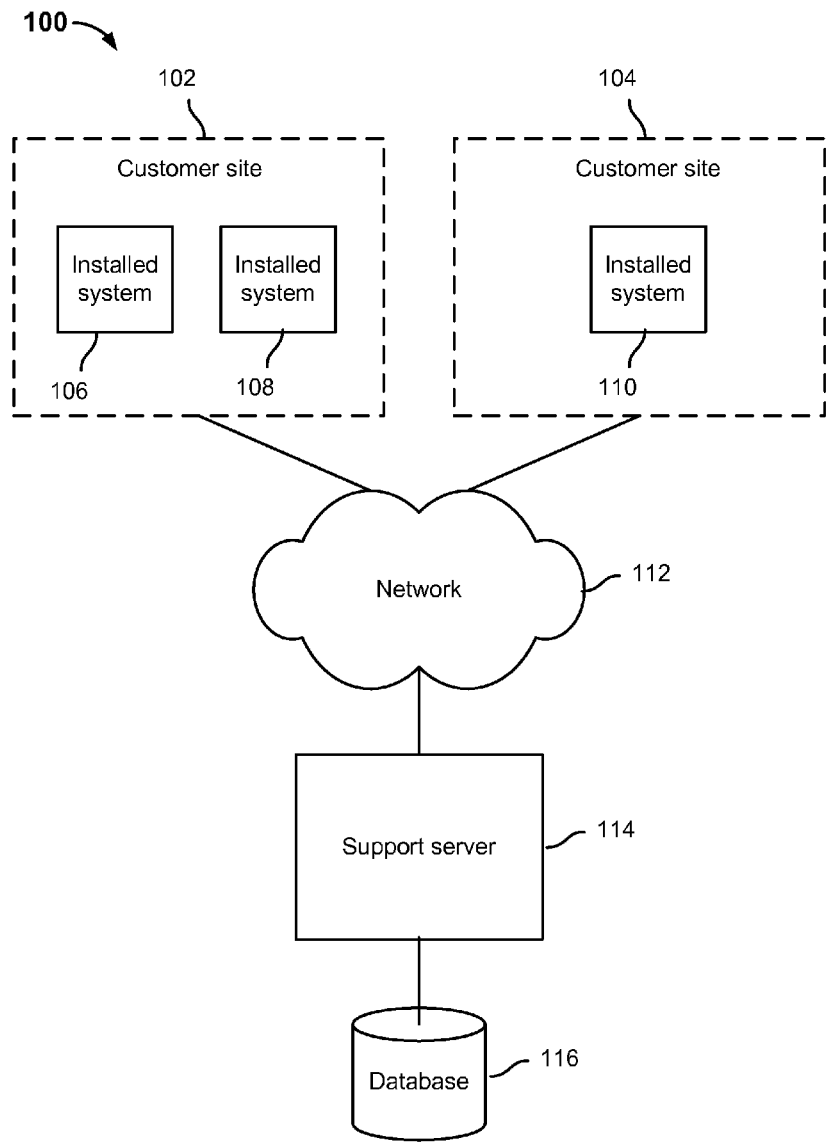
FIG. 1 is a diagram showing an embodiment of a system for providing support for customers.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Conventional techniques of providing customer and/or technical support include call centers, web chat or callback, and internet self-service (e.g., the customer can sign on to the vendor's portal and submit information related to a problem). However, such conventional techniques can be costly and also inefficient. For example, for a customer attempting to reach a vendor's representative via telephone, web chat, or callback, usually several pieces of information need to be obtained from the customer and verified by the vendor before the case for the problem can be created. Often, this is a time consuming and error prone process, where the customer is expected to describe an enterprise with which he/she is associated and/or a particular branch of the enterprise, the nature of the problem, the affected systems provided by the vendor, one or more locations at which the affected systems may be located, authentication information, and callback information, among others. The vendor representative that is responsible for the customer must then validate the information provided by the customer by, for example, comparing the customer provided information against customer information stored by the vendor. At any point in the process of the customer providing information and the validation of such information, incorrect information can be communicated (e.g., the customer describes an installed system incorrectly or the representative fails to note down the correct callback information) between the customer and vendor, which can cause inefficiencies in fulfilling the desired customer/technical support.

A mobile support application is disclosed. A mobile support application configured to run on a mobile device is used to facilitate communication back and forth with a vendor. In various embodiments, the mobile support application sends a request that includes current geo-location data that is generated and automatically included in the request and in some embodiments, other information, to a vendor for customer and/or technical support. In some embodiments, the customer and/or technical support is related to one or more specific systems maintained by the vendor. The vendor can then use the geo-location data to determine a customer site associated with the request and/or one or more specific systems that are installed at the customer site. Then information associated with the request can be retrieved by the vendor to assist in providing support for such systems. Examples of installed systems include data backup systems and/or content management systems. By employing geo-location data provided by the mobile support application, the location of a request and the specific systems installed at the location can be easily and quickly identified by their geographic proximity to the mobile device. In this way, the vendor can provide appropriate support solutions efficiently by saving time and money that would have otherwise been used in validating information associated with the affected systems. Similarly, the customer can also save resources by being able to easily report problems and receive support wherever the system administrator may be within the customer's site. Furthermore, the vendor can also send updates to the customers through the mobile application to keep the customers updated on new developments on their cases and/or newly available offers.

FIG. 1 is a diagram showing an embodiment of a system for providing support for customers. System 100 includes customer site 102 that includes installed systems 106 and 108, customer site 104 that includes installed system 110, network 112, and support server 114. Network 112 can include high-speed data and/or telecommunication networks.

Each of customer site 102 and 104 comprises a physical location of a customer of the vendor (e.g., EMC Corporation) that is associated with support server 114. At each customer site, one or more installed systems are supported by the vendor per the terms of a customer support contract between the customer and the vendor. A customer support contract may include a service-level agreement (SLA) and/or other agreements or terms of service. An example of a customer associated with either or both of customer sites 102 and 104 can be associated with a large enterprise or a particular branch of an enterprise. A customer site can be a physical campus (including one or more buildings) of an enterprise or a particular branch of an enterprise. As shown in the example, a customer site can include one or more installed systems (e.g., located within one or more data centers of the customer site). In some embodiments, an installed system at a customer site is configured to provide services specific to that particular customer. For example, a backup system installed at Corporation X can perform regular backups of data at a frequency desired (e.g., each night at midnight) by the Corporation. In some embodiments, one or more system administrators can configure and interact with the installed systems at a particular customer site.

In various embodiments, support server 114 is associated with the vendor of installed systems 106, 108, and 110. In some embodiments, support server 114 is operated by the vendor or a third-party associated with the vendor. Support server 114 is configured to access information stored at database 116, which comprises one or more databases. Database 116 may be implemented as a component of support server 114 or as a component separate from support server 114. Database 116 is configured to store information including, but not limited to: information associated with installed systems (e.g., with which each customer installed system is associated, the specifications and/or configurations associated with each installed system, a geographic location associated with each installed system), profiles associated with each mobile device on which the mobile support application is installed, current promotions offered by the vendor, profiles of support technicians (e.g., a support technician can be dispatched to address an issue with respect to an installed system, if appropriate), and/or case profiles (e.g., each case profile is created in response to a request for support sent to support server 114).

Support server 114 is configured to receive requests for customer/technical support sent from a mobile device that may be located at or within the vicinity of a customer site such as customer sites 102 and 104. For example, a system administrator at a customer site could notice a problem with an installed system at that customer site and send a request for support via the mobile support application that is installed on his/her mobile device. Among other information, the request may include the current geo-location data (e.g., GPS coordinates) associated with the mobile device (where the geo-location data is generated by the mobile device and also automatically included in the request), a described problem/issue that requires support with respect to the specific installed system, a timestamp, data identifying the mobile device user and any geographic and/or language preferences associated with the mobile device user, and/or other data identifying the affected installed system (e.g., a photo of a bar code or serial number on the affected installed system and/or a photo of a faulty hardware part). In response to receiving such a request, support server 114 is configured to use at least the geo-location data to retrieve information relevant to the request. For example, information relevant to the request may include data associated with a specific installed system at the customer site associated with the request. The specific installed system can be identified, for example, by matching the geo-location included in the request to corresponding geo-location data associated with one or more specific installed systems for which information is stored in database 116. In some embodiments, if more than one specific installed system is determined (e.g., the systems are all located very close to each other), than other information besides geo-location data from the request may be used to narrow the number of determined specific installed systems, if appropriate. In some embodiments, if more than one specific installed system is determined, then a list of the specific installed systems that are within a certain proximity of the location as indicated by the geo-location data of the request are sent to the mobile device for the user to select one of the systems at the mobile device. Once the specific installed system(s) are determined, then information corresponding to these installed systems can be retrieved from database 116. For example, information retrieved on determined installed systems can include configuration information, software version/model/manufacturer, history of maintenance/reported problems or bugs, installation data, software patches, customer support contract, and a list of support technicians that are trained to fix problems associated with the installed system, among others.

In some embodiments, support server 114 is configured to create a case profile for each request for support. A case profile, for example, may document the information submitted in the request, retrieved information associated with the installed system(s) associated with the request, and/or progress/status on the support provided for the installed system(s). In some embodiments, support server 114 is configured to provide notifications (e.g., push notifications) to a mobile device based on a changed status associated with a case created for a request received from that mobile device. For example, push notifications to the mobile device can indicate that a case has been created, a support technician is on the way, a communication will be sent to the mobile device shortly regarding the case, and the problem included in the request has been fixed and the case will be closed.

In some embodiments, support server 114 is configured to process requests other than those for technical help. In some embodiments, because support server 114 has access to geo-location data corresponding to installed systems stored in database 116, support server 114 is configured to respond to a request sent through the mobile support application at a mobile device of a sales engineer who desires to know which installed systems are located in the vicinity of his/her current location. As the geo-location data of the sales engineer may be included in his/her request, that geo-location data can be compared against geo-location data of installed systems to determine whether any match the geo-location of the request (e.g., within a certain tolerance). Using the information returned regarding one or more installed systems in the vicinity, the sales engineer can determine whether there is a nearby installed system to which he would like to travel and perform his duties (e.g., tell the customer about any technical upgrades that are available for the system). In another example, support server 114 is configured to respond to a request sent through the mobile support application at a mobile device of a salesperson associated with the vendor who desires to learn about the case associated with the customer site to which he/she is visiting. For example, the request sent by the salesperson can include his/her current geo-location which support server 114 can use to determine a corresponding case (e.g., by comparing the geo-location data included in the request to the geo-location data associated with each created case profile).

In some embodiments, support server 114 is configured to send notifications to mobile devices on which the mobile support application are installed. In some embodiments, such notifications can be made in response to/during the course of fulfilling a support request or they can be made as the notifications become available. For example, notifications can include changed statuses associated with existing support cases, available offers and promotions, customer support contract upgrade/renewals, and/or the availability of a new or replacement hardware part.

In some embodiments, a customer/technical support representative (not shown in the example) associated with the vendor can access support server 114 and intervene with the automated tasks of support server 114 as the support representative finds suitable. For example, the customer/technical support representative can call or email the representative that sent the request for support to update him/her on the status of his/her case and/or report updates in the case. In some embodiments, data included in the request such as language preferences can be used to determine a customer/technical support representative who can communicate fluently in the language indicated in the language preferences.

Figure 2:
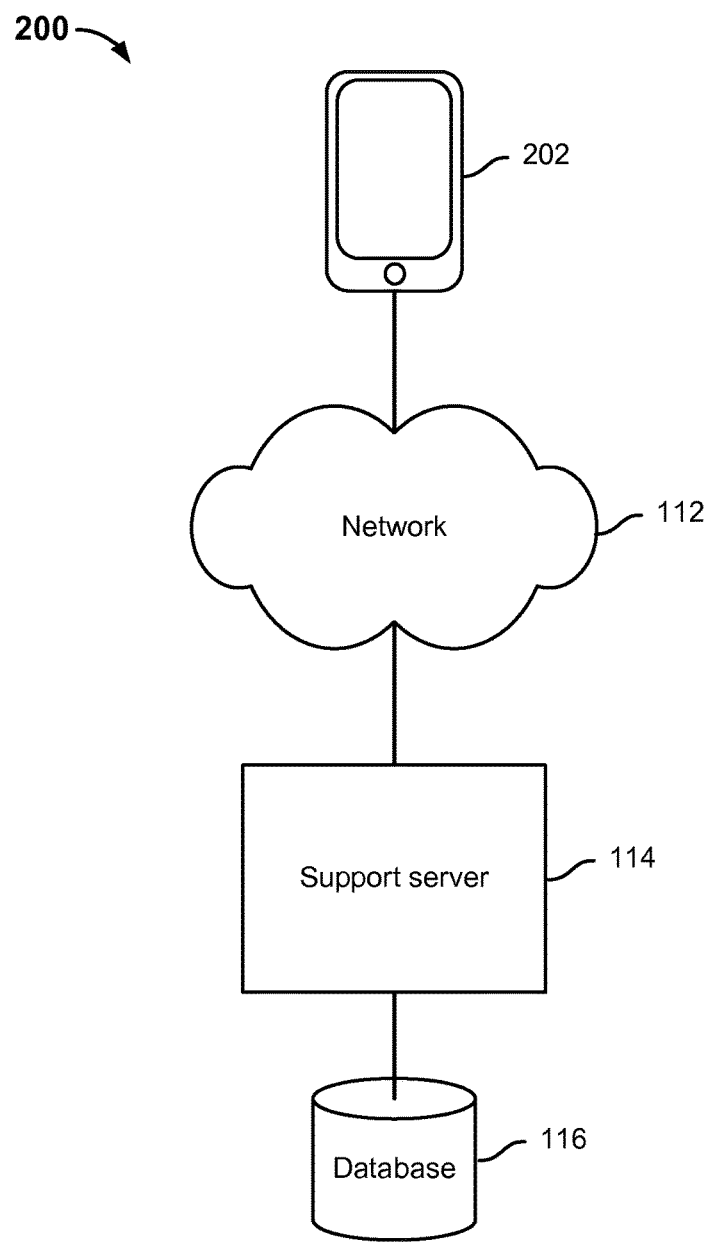
FIG. 2 is a diagram showing an embodiment of a system for providing support for customers.

FIG. 2 is a diagram showing an embodiment of a system for providing support for customers. System 200 includes mobile device 202, network 112, and support server 114. System 200 is an example of system 100 in which mobile device 202 is used to send and receive communication with support server 114 over network 112.

In various embodiments, the mobile support application is installed on mobile device 202. Examples of mobile device 202 include a smart phone, a tablet device, a laptop computer, or any other computing tablet. For example, the mobile support application can be downloaded from a website associated with the vendor and/or available at an online mobile application store. In some embodiments, after completing download of the mobile support application, upon the first use of the mobile support application, the user at mobile device 202 will be prompted for user input of registration/identifying information including customer site/installed systems identifying information, authentication information, language and/or time preference settings, authentication information, and any other appropriate information. Such user inputted information can be stored at either or both of mobile device 202 and support server 114 (e.g., so that the information need not be entered again per each submission of a request) and may be automatically included in a request sent through the mobile support application to support server 114. In some embodiments, mobile device 102 includes a display and an input area (e.g., a keyboard or touch screen) in which a user can input information to be included in a request such as, for example, a description of a problem associated with an installed system or a selection of a presented option. In various embodiments, mobile device 202 includes various native geo-location data generating functionalities (e.g., mobile device 202 stores current geo-location data such as GPS coordinates), camera functionalities, and/or time keeping functionalities, of which any one or more may be automatically included with each transmission of a request through the mobile support application from mobile device 202. For example, each transmission of a request through the mobile support application from mobile device 202 may automatically include mobile device 202's current GPS coordinates, time zone setting, language preference setting, phone number, email address, the current time, and/or a photo. In various embodiments, mobile device 202 is configured to receive and display notifications from support server 114 associated with changes in case profiles, available offers and promotions, customer support contract upgrade/renewals, and/or the availability of a new or replacement hardware part.

In some embodiments, mobile device 202 can be used by a system administrator at the customer site, a salesperson associated with the vendor who is at or en route to the customer site, and/or a sales engineer associated with the vendor who is in the vicinity of a customer site, as described above. An advantage of employing a mobile device application to provide support is that the prevalence and convenience of mobile devices has made them easy to be carried around by a user, no matter where the user wanders throughout the customer site (e.g., a system administrator could move from building to building without needing to wait by a phone or desktop computer for customer/technical support help). By storing identifying information associated with each mobile device and mobile device user, this information can be easily obtained with each request from such a device, instead of requiring the user to provide such information each time he/she seeks support from support server 114.

Figure 3:
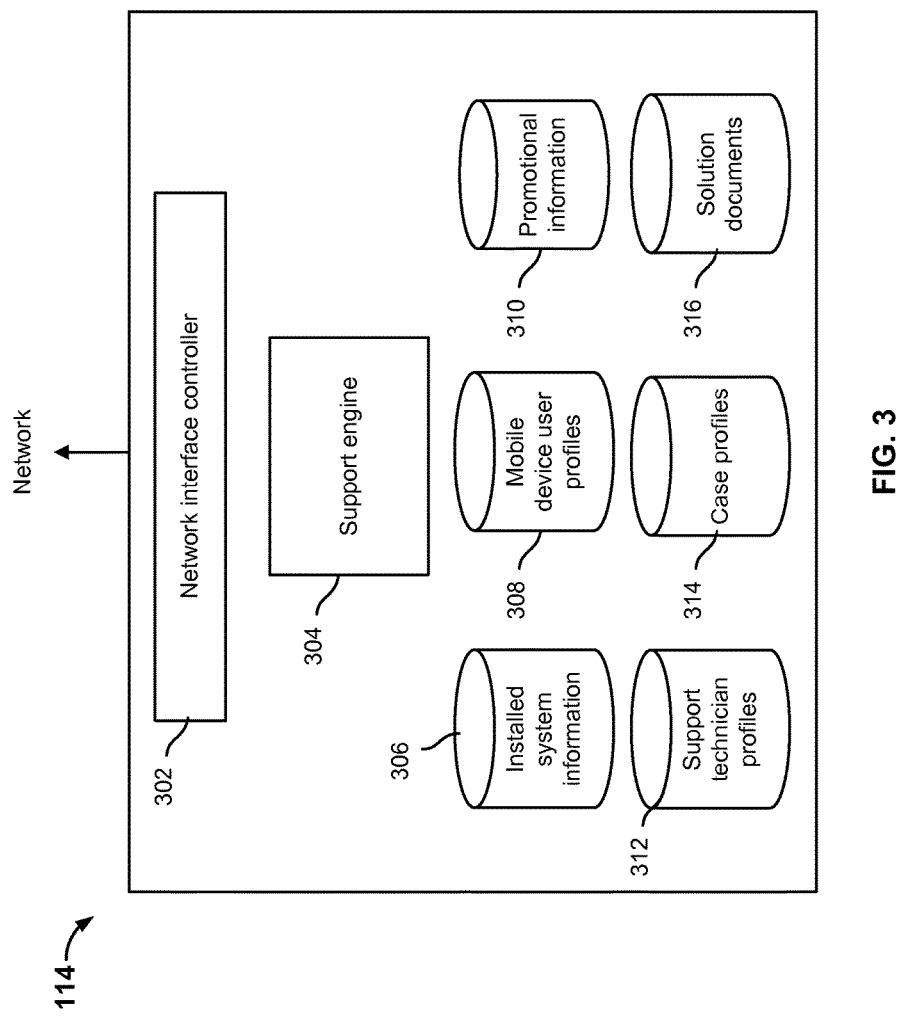
FIG. 3 is an example of a support server.

FIG. 3 is an example of a support server. In some embodiments, support server 114 of FIGS. 1 and 2 can be implemented with this example. In the example, support server 114 includes network interface controller 302, support engine 304, installed system information 306, mobile device user profiles 308, promotional information 310, support technician profiles 312, case profiles 314, and solution documents 316. Each of installed system information 306, mobile device user profiles 308, promotional information 310, support technician profiles 312, case profiles 314, and solution documents 316 may be implemented using one or more databases. In some embodiments, support server 114 can store more or fewer types of information than those shown in the example. Network interface controller 302 is configured to send and receive data over the network.

Support engine 304 is configured to receive and send communication over the network and process received requests. Support engine 304 is configured to process requests and receive/send communication by at least accessing the databases associated with installed system information 306, mobile device user profiles 308, promotional information 310, support technician profiles 312, case profiles 314, and solution documents 316. In various embodiments, the requests are generated and sent by mobile support applications on mobile devices (e.g., such as mobile device 202 of system 200). In some embodiments, registration information input by the user at the mobile device in response to prompts by the mobile support application (e.g., when the application is first downloaded and installed) is sent to the user. For example, such user input information may include user identifier and/or callback information, customer site/installed systems identifying information, authentication information, language and/or time preference settings, and authentication information, and can be stored in a mobile device user profile at mobile device user profiles 308. In some embodiments, each mobile device user profile may also include a unique identifier associated with the mobile device. As more information is received from a mobile device regarding the user of the device, the corresponding mobile device user profile can be updated.

Installed system information 306 is configured to store information associated with each installed system supported by the vendor associated with support server 114. In some embodiments, installed system information 306 includes information corresponding to each installed system including an identifier (e.g., serial number) associated with that system, geo-location corresponding to the system, a customer site at which the system is installed, and/or configurations, and/or any other appropriate information.

In some embodiments, support engine 304 is configured to receive a request for customer service/technical support. The request can be sent from a mobile device that is currently located at a customer site at which one or more systems are maintained by the vendor associated with support server 114. In various embodiments, the request includes at least geo-location data (e.g., GPS coordinates) associated with the location of the mobile device that sent the request. The request may also include one or more of the following: a user input description of a problem (e.g., "Backup would not start at configured start time"), data identifying a customer site, data identifying one or more affected installed systems (e.g., photos of bar codes on the systems), and contact information. In response to receiving a request for support, support engine 304 is configured to use at least the geo-location data included in the request to retrieve information associated with the request (e.g., data associated with one or more specific systems installed at the customer site associated with the request). For example, support engine 304 may compare the geo-location data included in the request to geo-location data corresponding to the systems of installed system information 306 to find one or more matching specific installed systems. For example, two sets of geo-location data may be determined to be matching if their difference is within a given tolerance. The matching specific installed systems are determined to be the systems that are installed at the customer site from which the request was sent. In some embodiments, if more than one installed system is found to be matching, other information included in the request may be used to select a subset of the matched systems. For example, any data identifying the specific installed system (e.g., a photo of a bar code, a system serial number, a textual description of the system) can be used to select only those matched system(s) that fit the identifying data. In some embodiments, if more than one installed system is found to be matching, then a list of the matching installed systems is returned to the mobile device to allow the user to select the system that is associated with the reported issues. In this way, a mobile device user such as a system administrator at the customer site can send a request for support to support server 114 with as little information as only the geo-location data associated with the location from which the request is sent to allow support server 114 to identify the specific problematic installed systems.

In some embodiments, if no match of an installed system is found after comparing the geo-location data of the request against the information in installed system information 306, then support engine 304 may send a prompt via the mobile support application at the mobile device of the user asking if an installed system has moved within the same customer site (e.g., the relevant installed system has moved into another building). If the user indicates that the installed system has in fact moved and therefore its geo-location data no longer matches the geo-location of its corresponding entry stored at installed system information 306, support engine 304 could obtain the customer site at which the user is currently at (e.g., based on a customer site identifying information included in the request and/or a match between the geo-location data included in the request and stored geo-locations for customer sites) and present to the user at the mobile device a list of specific installed systems of record that are installed at that customer site. The user can then select among one or more of the list to indicate which have been moved to the present location indicated in the request and are also experiencing issues. The new geo-location(s) of the selected installed systems can be updated in their corresponding information at installed system information 306. In some embodiments, if no match of an installed system is found after comparing the geo-location data of the request against the information in installed system information 306, then support engine 304 may send an error message via the mobile support application at the mobile device to indicate that no supported installed systems are found within the area from which the request was sent.

In some embodiments, once one or more installed systems have been determined to be associated with the request, support engine 304 is configured to search through solution documents 316 to identify whether there are any relevant solution documents stored in solution documents 316 that could address the problems associated with the systems. For example, each document within solution documents 316 may be submitted and/or authored by the vendor and/or a customer thereof with respect to problems experienced and known solutions for fixing the problems. For example, support engine 304 may perform keyword searches using keywords included within the problem description of the request against keywords included in solution documents 316 and return the matching documents for the user at the mobile device. In some embodiments, solution documents will be provided to customers in the language that matches the preferred language setting on their mobile device and/or indicated in the request.

In some embodiments, once one or more installed systems have been determined to be associated with the request, support engine 304 is configured to dispatch a support technician to the customer site at which the system(s) are located based at least in part on the geo-location data included in the request. In some embodiments, profiles of support technicians associated with the vendor are stored at support technician profiles 312. A profile associated with a support technician may include the support technician's current location (e.g., as indicated by the most recent update of his/her location sent from the support technician's own mobile device), skills, contact information, language fluency, and/or hours of work. In some embodiments, support engine 304 is configured to determine one or more support technicians who are currently working and are also located closest to the location included in the request. Support engine 304 can then dispatch at least one of the determined support technicians to the customer site at which the system(s) are located to fix the affected installed systems.

In some embodiments, in response to receiving a request for customer service/technical support, support engine 304 is configured to create/open a case profile for the request and store the profile in case profiles 314. For example, a case profile may include information included within the request, information associated with the user of the mobile device from which the request was sent (e.g., as copied from mobile device user profiles 308), the current status of the case, the preferred method of contact (e.g., phone, email, push notification, etc.), and the determined specific installed systems, among other information. In some embodiments, over time, support engine 304 can update a case profile to reflect any new developments (e.g., change in status).

In some embodiments, support engine 304 is configured to send promotional information to mobile devices. In some embodiments, support engine 304 is configured to send promotional information to each mobile device for which a profile exists in mobile device user profiles 308. For example, promotional information can be specific to a particular mobile device user and/or the customer site associated with that user or general to all users. Promotional information may include offers to upgrade software/hardware, offers to download new software patches, offers to replace hardware parts, and offers to renew support contracts, for example. In some embodiments, support engine 304 pushes out notifications regarding such offers to the mobile devices as they become relevant/available.

FIG. 4 is an example of entries at a database table storing installed system information. In some embodiments, installed system information 306 is implemented with the example. In the example, each column represents a characteristic/property/attribute (e.g., "Installed system identifier," "Geo-location data," "Customer site," "Configurations") of the installed system and each row (e.g., 402 and 404) is associated with characteristic/property/attribute values corresponding to an installed system that is supported by the vendor. The systems associated with rows 402 and 404 are associated with backup functionalities. For example, for the installed system associated with row 402, it is associated with identifier "FD2349Af4h42M," GPS coordinates of "N 28.132°, W 82.543°," customer site of "World Inc—New York, USA" (e.g., the New York branch of the enterprise "Word Inc"), and configurations of "Start backup every night at midnight." To determine a specific installed system included in a request for support, the information included in the "Geo-location data" column can be used to match against the geo-location data included in the request to find a match (e.g., within a given tolerance). Once a matching installed system is found within the installed system information database, other information associated with that system may be retrieved from the installed system information database (e.g., configuration information) as well as other databases storing information corresponding to that system. In some embodiments, there could be more or fewer columns of characteristics/properties/attributes than those shown in the example.

Figure 5:
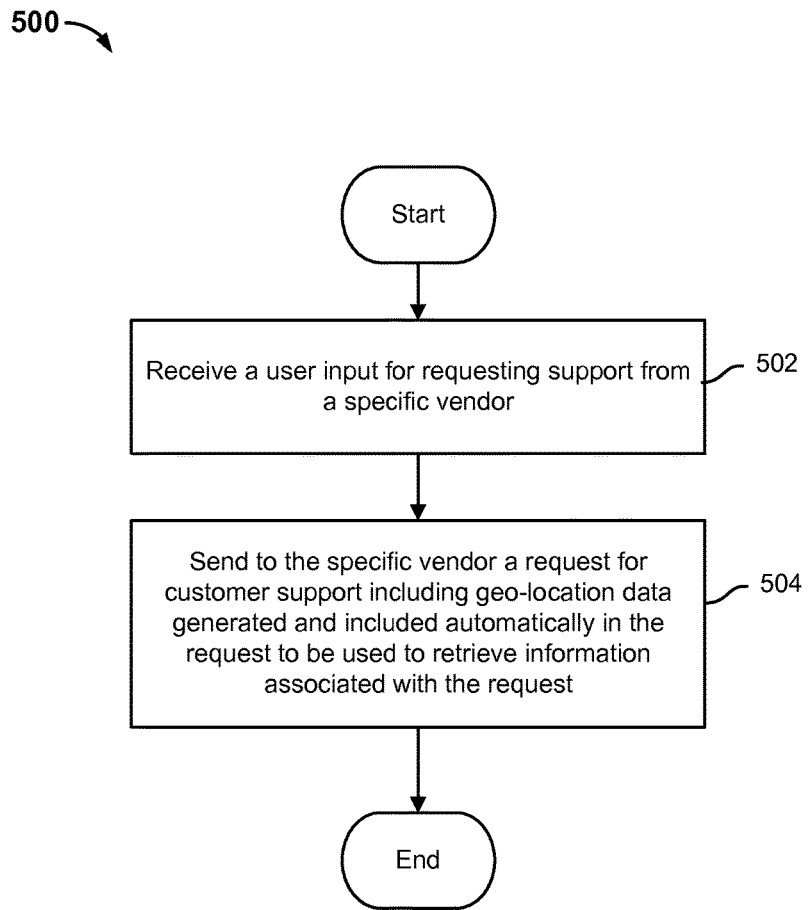
FIG. 5 is a diagram showing an embodiment of a process for submitting a request for support.

FIG. 5 is a diagram showing an embodiment of a process for submitting a request for support. In some embodiments, process 500 is implemented by mobile device 202.

At 502, a user input for requesting support from a specific vendor is received. For example, a user who wishes to report a customer support issue with respect to an installed system can access a mobile support application on his/her mobile device. Upon opening the mobile support application, for example, the mobile support application can prompt the user to input information regarding a problem associated with a specific system installed at a customer site with which the user is associated. The user can input, via a keyboard or touch screen buttons, a textual description and/or selection(s) of enumerated options associated with the problem associated with the specific installed system. In some embodiments, the mobile support application may also prompt the user for other information, such as data identifying a specific installed system, a description of the problem with the system, data identifying a customer site at which the system is installed, data identifying the user that sent the request and/or language and/or time zone settings, and contact information associated with the user (e.g., phone number, email address), for example.

At 504, the request for customer support including geo-location data generated and included automatically in the request to be used to retrieve information associated with the request is sent to the specific vendor. In some embodiments, the mobile support application automatically includes the request data that is in addition to and/or supplements the user inputted information. In various embodiments, the mobile support application automatically includes a current geo-location data that is available on the mobile device (e.g., by virtue of a native geo-location collecting functionality) and a current time. In some embodiments, the mobile support application may also include any default language preferences, time zone settings, unique identification of the mobile device, user (e.g., phone number, email address) data, or authentication data from the mobile device if this data is not already included in the user inputted information.

Figure 6:
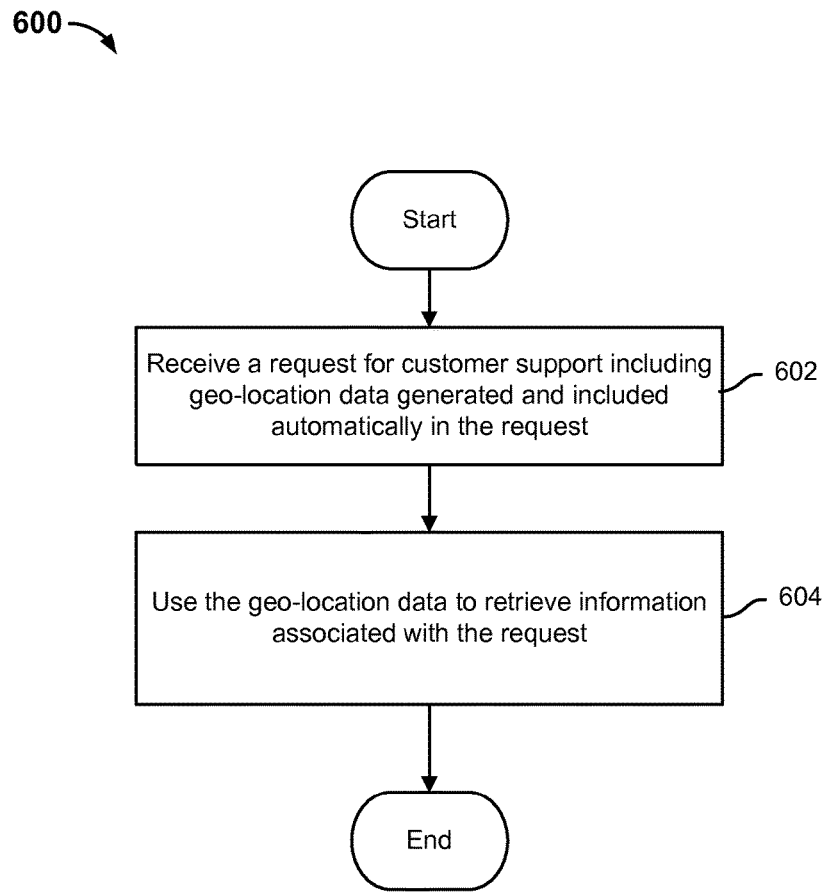
FIG. 6 is a flow diagram showing an embodiment of a process for retrieving information.

FIG. 6 is a flow diagram showing an embodiment of a process for retrieving information. In some embodiments, process 600 is implemented by support server 114.

At 602, a request for customer support including geo-location data generated and included automatically in the request is received. In some embodiments, the request was generated and sent by a mobile support application that is installed at a mobile device. For example, the request can include geo-location data associated with the location of the mobile device from which the request was sent, data identifying a specific installed system, a description of the problem with the system, data identifying a customer site at which the system is installed, data identifying the user that sent the request and/or language and/or time zone settings, contact information associated with the user (e.g., phone number, email address), and a timestamp.

At 604, the geo-location data is used to retrieve information associated with the request. For example, the geo-location data included in the request is compared against the stored geo-location data corresponding to various installed systems. If the geo-location data included in the request matches the stored geo-location data of a particular installed system (within a given tolerance), then that installed system is determined to be a specific installed system for which information may be retrieved. For example, information that can be retrieved can be associated with the determined specific installed system (e.g., configuration information, a customer support contract that is specific to the specific installed system, associated customer information, a history of maintenance) or associated with the particular customer associated with the request (e.g., a customer support contract associated with the particular customer, promotions available to the particular customer) or associated with anyone (e.g., general offers available to all current customers and non-customers).

The following example illustrates how process 500 and 600 may be used together: system administrator Sam at a customer site notices that a backup system is not properly performing its configured function. He is not certain of what the cause of the problem is, whether it is a faulty hardware part, software bug, or something else. So, Sam accesses the mobile support application on his smart phone and initiates a request for support. The mobile support application presents a form in which Sam inputs a textual description of the problem (e.g., "The system is not performing backup at the configured start time.") and also uploads a photo that he took of a hardware component that he suspects may be malfunctioning. In some embodiments, the mobile support application sends its current geo-location data to the support server and receives from the server one or more specific installed systems in Sam's vicinity, which Sam can then select the system that is associated with the problem. Sam also inputs his contact information into the request and time zone and language settings before submitting the form. The mobile support application automatically includes the current geo-location data and/or current time, authentication data, and Sam's contact information that is available on the mobile device in the request and submits it to the support server.

In response to receiving the request, the support server uses the geo-location data in the request to find a specific installed system located at (or near, e.g., within a given tolerance or radius of area away) the location indicated by that geo-location data. In some embodiments, if Sam has already selected the specific installed system with which the problem is associated, then the support server can simply retrieve information associated with that system without processing the geo-location data in the request again. The support server then creates a case profile for the request to begin providing support for the system and then retrieves information associated with that specific installed system. In this way, information associated with the specific installed system that requires support can be easily ascertained with minimal effort required from a representative at a customer site (Sam) by using an automated process at the support server of the vendor's. Sam can move about the customer site to attend to other tasks and simply be contacted via his mobile device when his case is updated.

Figure 7:
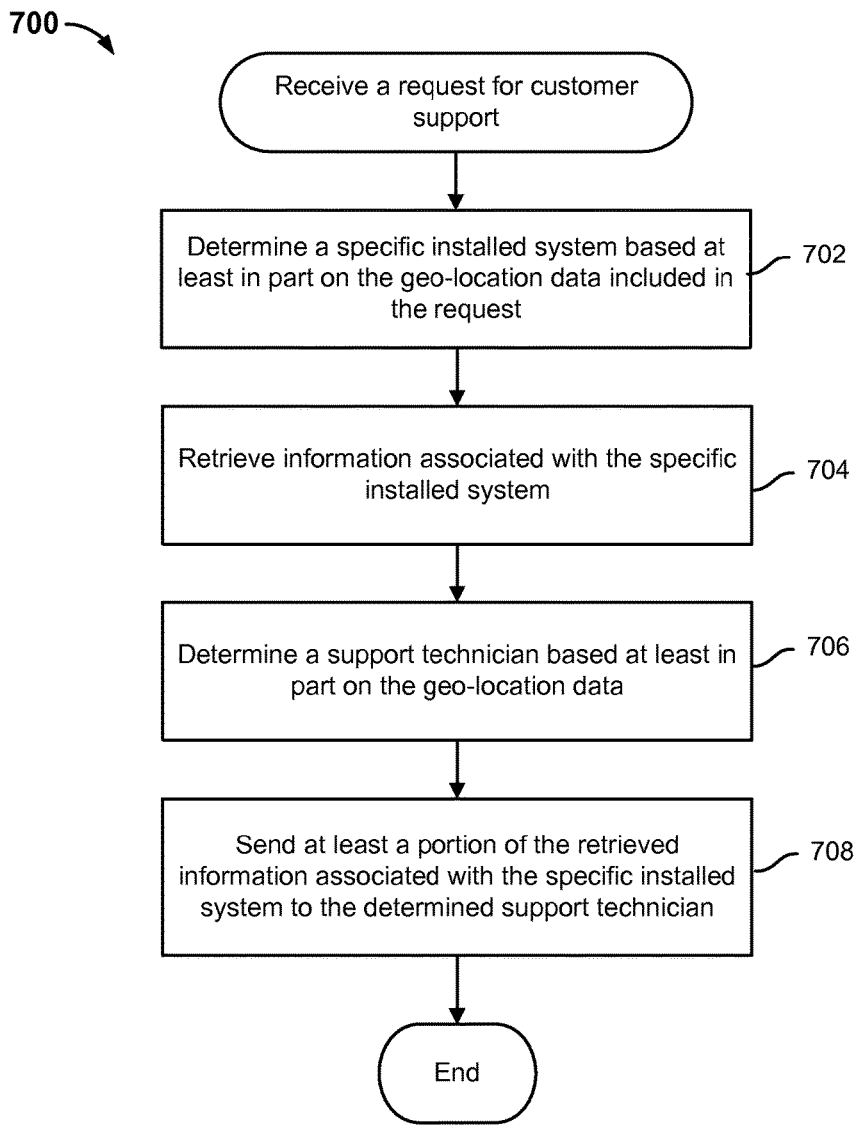
FIG. 7 is a flow diagram showing an embodiment of a process for providing customer/technical support in response to a request for support.

FIG. 7 is a flow diagram showing an embodiment of a process for providing customer/technical support in response to a request for support. In some embodiments, process 700 is implemented at support server 114.

Process 700 may be used to determine an appropriate support technician to dispatch to the customer site at which a specific installed system that requires support is located.

At 702, a specific installed system is determined based at least in part on the geo-location data included in the request. For example, the geo-location data included in the request may be used to determine a specific installed system with a matching set of geo-locations because the request is presumed to be sent from a customer site at which one or more specific systems are installed.

At 704, information associated with the specific installed system is retrieved. For example, stored information corresponding to the specific installed system can be retrieved from one or more databases. For example, such information can include the model/version, configuration, address, history of maintenance, the customer representative of record that is responsible for the system, and the terms of the associated customer support contract, among others.

At 706, a support technician based at least in part on the geo-location data is determined. In some embodiments, a support technician associated with the vendor who is close/nearby to the location of the specific installed system is determined. An example technique of finding a close/nearby support technician is to compare the geo-location data included in the request to the most recent geo-location data associated with various available support technicians. The support technician(s) that are determined to be currently located closest to the specific installed systems are determined. In some embodiments, in addition to proximity, other factors (e.g., skill set, experience level, language fluency, availability) are also considered in selecting an appropriate support technician to fix the problems of the specific installed system.

At 708, at least a portion of the retrieved information associated with the specific installed system is sent to the determined support technician. In some embodiments, the retrieved information is sent to the selected at least one support technician so that the support technician can become informed on the background/context/location of the specific installed system to which he/she is dispatched to fix. In some embodiments, at least some information included in the request (e.g., the problem description, contact information of the sender of the request) is also sent to the support technician so that he/she can be informed about the specific issue that he/she is to address and how to get in touch with the representative at the customer site. In some embodiments, the information is sent to a mobile device of the support technician.

Figure 8:
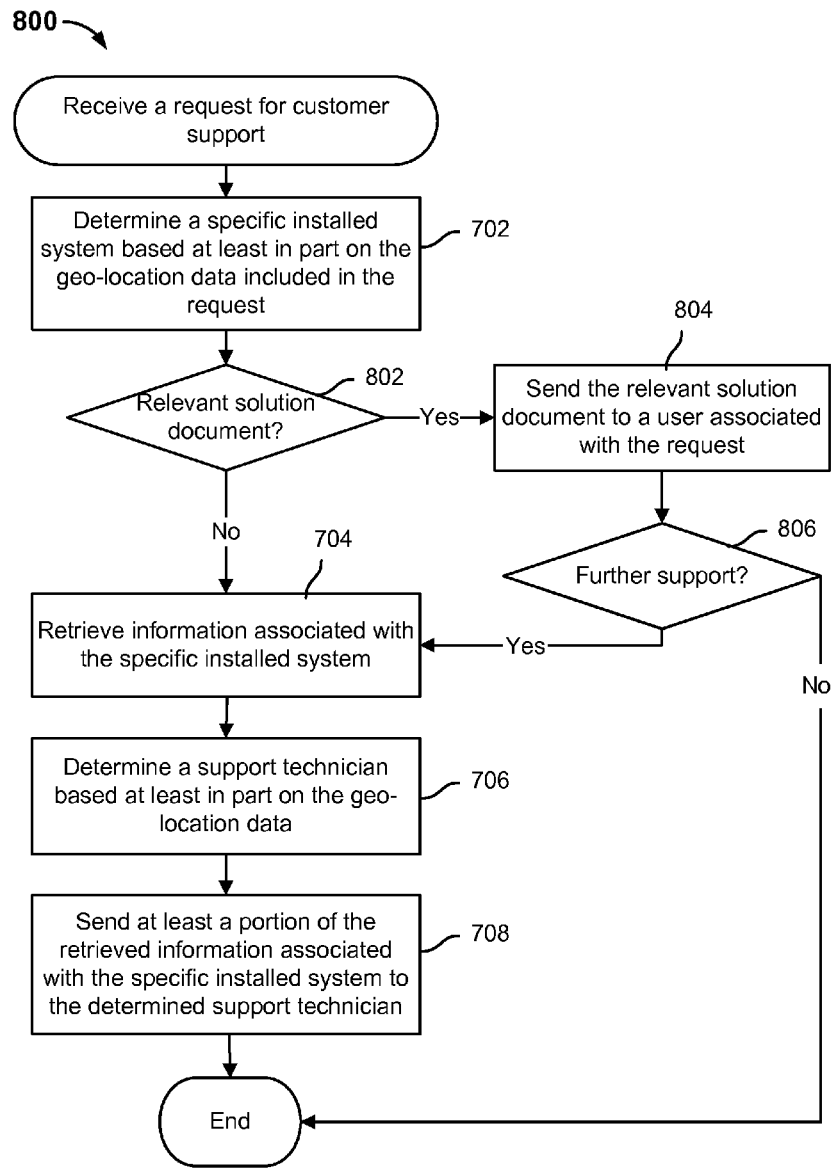
FIG. 8 is a flow diagram showing another embodiment of a process for providing customer/technical support in response to a request for support.

FIG. 8 is a flow diagram showing another embodiment of a process for providing customer/technical support in response to a request for support. In some embodiments, process 800 is implemented at support server 114.

Process 800 is similar to process 700 but includes the possibility of first automatically providing the user associated with the request with a solution document that may address the user's concern with respect to the specific installed system and/or language preferences. However, if a relevant solution document is not found (e.g., in the language as indicated by the language preferences) and/or does not fully address the user's concern, then an appropriate support technician is determined.

After a specific installed system is determined based at least in part on the geo-location data included in the request at 702, a relevant solution document is determined at 802. For example, a relevant solution document may be a document that is created by a customer, the vendor, or a third party, that includes known solutions to various problems associated with installed systems. Such solution documents may be stored in one or more databases and updated over time as more documents become available. In some embodiments, a solution document may be available in one or more languages or is able to be translated into various languages. In some embodiments, a document may even include selectable areas that link to web pages at which appropriate content (e.g., software patches) may be obtained. In some embodiments, a relevant solution document is one that includes keywords that correspond to the problem description included in the request. In some embodiments, a relevant solution document is one that is also written in the same language as indicated by the language preference of the mobile device and/or as indicated in the request. In the event a relevant solution document is found, at 804, it is sent to the user associated with the request. For example, the solution document is sent to the mobile device of the user. Otherwise, in the event that a relevant solution document is not found, then an appropriate support technician is determined using 704, 706, and 708, as described for process 700. Once the user reviews the sent relevant solution document at his/her user mobile device, the user is prompted to indicate whether he/she would like any additional support at 806. For example, if the user has found that the received solution document does address/solve the issue with respect to the specific installed system, then the user may select that further support is not desired. Otherwise, if the user has not found that the received solution document helps or does not fully address/solve the issue with respect to the specific installed system, then the user can indicate that further support is desired and an appropriate support technician is determined using 704, 706, and 708, as described for process 700.

Figure 9:
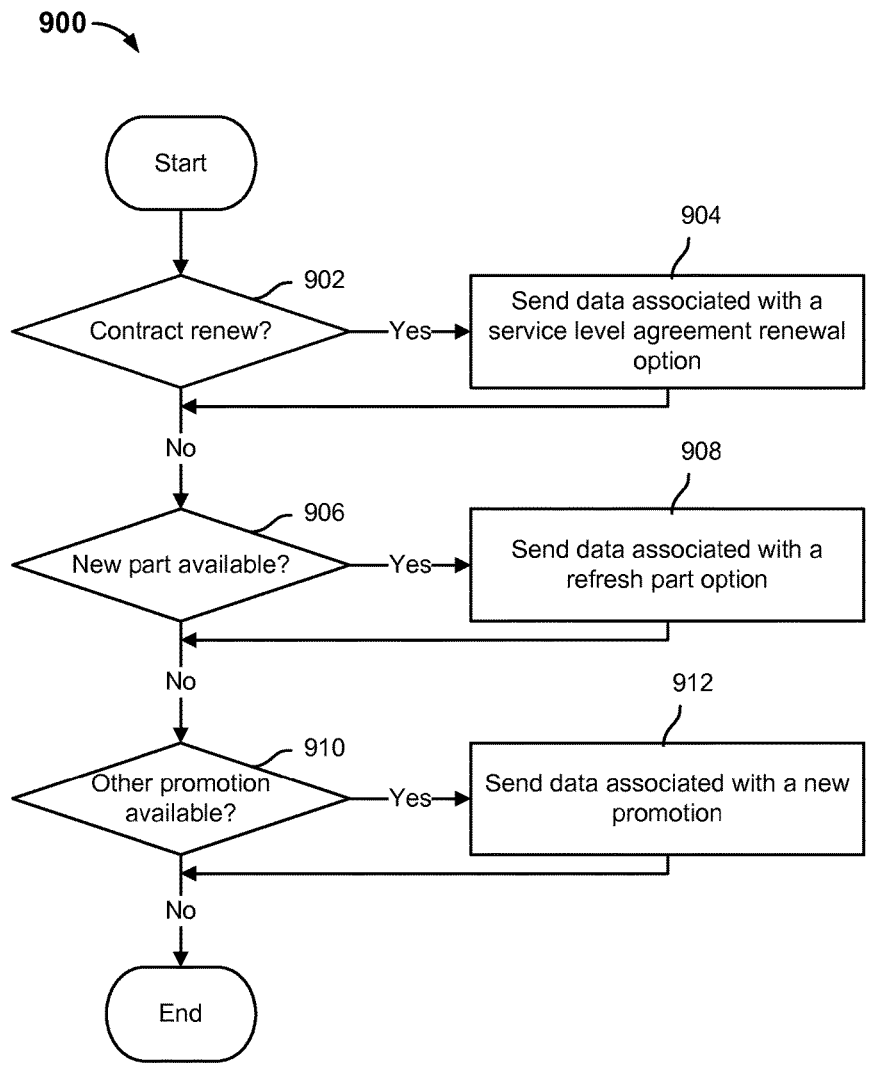
FIG. 9 is a flow diagram showing an embodiment of a process of providing promotions to a mobile device of a user associated with a customer.

FIG. 9 is a flow diagram showing an embodiment of a process of providing promotions to a mobile device of a user associated with a customer. In some embodiments, process 900 is implemented by support server 114.

In some embodiments, process 900 is initiated in response to an event, such as a received indication that a user has selected to view promotion/upgrade options at a mobile support application installed at the user's mobile device or a received request for support. For example, the user can be any mobile device user that has the mobile support application installed on his/her mobile device (e.g., a user who has a profile stored at mobile device user profiles 308) and is associated with at least one specific installed system. The user can be a system administer at a customer site who is responsible for one or more specific installed systems, for example. In some embodiments, process 900 is initiated whenever the user accesses the mobile support application at the mobile device, without specifically selecting to review promotion/upgrade options. In some embodiments, process 900 is initiated whenever the user sends a request for support to the vendor.

At 902, it is determined whether a remaining time before expiring associated with a customer support contract is lower than a threshold value. Put another way, it is determined whether a customer support contact (which may be associated with a specific installed system or with all installed systems of a customer's) is nearing the end of the effective period. If so, at 904, data associated with an option to renew the customer support contract on the same or new terms is sent to the user at the mobile device. In some embodiments, the customer support contract renewal data may also include a price quote for each particular customer support contract renewal option. Otherwise, control passes to 906.

At 906, it is determined whether a new hardware part associated with the specific installed system is available. In some embodiments, it is also determined whether a replacement hardware part associated with the specific installed system is available. If so, at 908, data associated with an option to refresh the part is sent to the user at the mobile device. In some embodiments, the part refresh data may also include a price quote for each particular part option. Otherwise, control passes to 910.

At 910, it is determined whether any other promotion/offer associated with the specific installed system is available. If so, data associated with the new promotion/offer is sent to the user at the mobile device at 912. Otherwise, process 900 ends.

While 902, 906, and 910 are shown in the example to be performed in that sequence, in some embodiments, the three determinations can be performed in any other appropriate sequence or even concurrently. Furthermore, in some embodiments, more or fewer than determinations 902, 906, and 910 may be performed.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of retrieving information associated with a request for support, comprising:
   receiving, by a support engine executed by a processor of a server, from a mobile device associated with a customer, a request for customer support including geo-location data of the mobile device associated with the customer, an identifier of a user that sent the request, authentication information, and a current timestamp that are included automatically in the request, wherein the request was received over a network, wherein the request includes a user configured language setting previously stored at the device, wherein the geo-location data is generated by the mobile device associated with the customer; and
   in response to the request, using, by the support engine, the geo-location data from the request to retrieve information associated with the request, wherein retrieving information includes:
      determining by the support engine whether corresponding geo-location data associated with one or more specific data backup systems located within one or more data centers of a customer site associated with the customer substantially matches the geo-location data from the request;
      in response to a determination that the corresponding geo-location data associated with the one or more specific data backup systems substantially matches with the geo-location data from the request,
         retrieving by the support engine the information associated with the one or more matching specific data backup systems, the retrieved information including configuration information of the one or more matching specific data backup systems and a history of maintenance of the one or more matching specific data backup systems;
      sending by the support engine, to the mobile device associated with the customer, a request to select at least one matching specific data backup system from among the one or more matching specific data backup systems, wherein a list of the one or more matching specific data backup systems is displayed on the mobile device associated with the customer; and
      receiving by the support engine, from the mobile device associated with the customer, a selection of the at least one selected matching specific data backup system;
      determining by the support engine whether an expiration time of a customer support contract associated with the at least one selected matching specific data backup system is lower than a threshold value;
      in response to determining that the expiration time of the customer support contract associated with the at least one selected matching specific data backup system is lower than the threshold value, sending, by the support engine, to the mobile device associated with the customer, data associated with an option to renew the customer support contract associated with the at least one selected matching specific data backup system;
      otherwise, in response to determining that the expiration time of the customer support contract is equal to or exceeds the threshold value, determining by the support engine whether a replacement or new hardware part associated with the at least one selected matching specific data backup system is available; and in response to determining that the replacement or new hardware part associated with the at least one selected matching specific data backup system is available, sending, by the support engine, to the mobile device associated with the customer, data associated with an option to refresh the replacement or new hardware part associated with the at least one selected matching specific data backup system;

creating, by the support engine, a case profile associated with the request, wherein the case profile includes information included within the request, information associated with a user of the device, and information associated with the at least one selected matching specific data backup system;

determining, by the support engine, a support technician to be assigned to the request for customer support based at least on the geo-location data from the request for customer support, geo-location data of a mobile device associated with the support technician, and one or more competencies of the support technician, wherein determining the support technician to be assigned includes obtaining a profile of the support technician and comparing the geo-location data from the request to the geo-location data of the mobile device associated with the support technician; and sending, by the support engine, a message to the mobile device associated with the support technician to dispatch the support technician for the request for customer support if the geo-location data of the mobile device associated with the support technician is proximate to the geo-location data from the request.

2. The method of claim 1, wherein the request further includes one or more of the following: data identifying a specific data backup system, a description of the problem with the specific data backup system, data identifying a customer site at which the specific data backup system is located, data identifying the mobile device, and contact information associated with the user.

3. The method of claim 1, wherein retrieved information associated with the request further includes one or more of the following: data associated with the matching specific data backup system at a customer site, an identifier associated with the customer site, and data associated with the customer support contract.

4. The method of claim 1, wherein using the geo-location data to retrieve information includes comparing the geo-location data to each of a plurality of geo-location data corresponding to a plurality of specific data backup systems.

5. The method of claim 1, further comprising sending at least a portion of the retrieved information to the determined support technician.

6. The method of claim 1, further comprising sending at least a portion of the request to the determined support technician.

7. The method of claim 1, wherein prior to the determination of the support technician, searching for a relevant solution document to be provided to the user.

8. The method of claim 1, wherein the customer support contract renewal data includes a price quote for each particular customer support contract renewal option.

9. A method for initiating a request for support, comprising:

receiving, at a mobile device associated with a customer, a user input for requesting support from a specific vendor; and sending, from the mobile device associated with the customer over a network, to the specific vendor a request for customer support including geo-location data of the mobile device associated with the customer, an identifier of a user that sent the request, authentication information, and a current timestamp that are included automatically in the request to be used to retrieve information associated with the request, wherein the geo-location data is generated by the mobile device associated with the customer, wherein sending to the specific vendor the request further comprises automatically including in the request a user configured language setting previously stored at the device, and wherein the information is retrieved based at least on a determination that corresponding geo-location data associated with one or more specific data backup systems located within one or more data centers of a customer site associated with the customer substantially matches with the geo-location data from the request, wherein the information is associated with the one or more matching specific data backup systems, retrieving the information associated with the one or more matching specific data backup systems, the retrieved information including configuration information of the one or more matching specific data backup systems and a history of maintenance of the one or more matching specific data backup systems;

receiving, at the mobile device associated with the customer, a request to select at least one matching specific data backup system from among the one or more matching data backup systems, wherein a list of the one or more matching specific data backup systems is displayed on the mobile device associated with the customer;

sending, from the mobile device associated with the customer over the network to the specific vendor, a selection of the at least one selected matching specific data backup system;

determining whether an expiration time of a customer support contract associated with the at least one selected matching specific data backup system is lower than a threshold value;

in response to determining that the expiration time of the customer support contract associated with the at least one selected matching specific data backup system is lower than the threshold value, sending, to the mobile device associated with the customer, data associated with an option to renew the customer support contract associated with the at least one selected matching specific data backup system;

otherwise, in response to determining that the expiration time of the customer support contract is equal to or exceeds the threshold value, determining whether a replacement or new hardware part associated with the at least one selected matching specific data backup system is available; and in response to determining that the replacement or new hardware part associated with the at least one selected matching specific data backup system is available, sending, to the mobile device associated with the customer, data associated with an option to refresh the replacement or new hardware part associated with the at least one selected matching specific data backup system.

10. The method of claim 9, wherein the device comprises a mobile device executing an application and further comprising generating the geo-location data using the application executing at the mobile device.

11. A computer program product for retrieving information associated with a request for support, the computer program product being embodied in a non-transitory computer readable medium and comprising computer instructions for:
  receiving, from a mobile device associated with a customer, a request for customer support including geo-location data of the mobile device associated with the customer, an identifier of a user that sent the request, authentication information, and a current timestamp that are included automatically in the request, wherein the request was received over a network, wherein the request includes a user configured language setting previously stored at the device, wherein the geo-location data is generated by the mobile device associated with the customer;
  in response to the request, using the geo-location data from the request to retrieve information associated with the request, wherein retrieving information includes:
    determining whether corresponding geo-location data associated with one or more specific data backup systems located within one or more data centers of a customer site associated with the customer substantially matches the geo-location data from the request;
    in response to a determination that the corresponding geo-location data associated with the one or more specific data backup systems substantially matches with the geo-location data from the request,
      retrieving the information associated with the one or more matching specific data backup systems, the retrieved information including configuration information of the one or more matching specific data backup systems and a history of maintenance of the one or more matching specific data backup systems;
      sending, to the mobile device associated with the customer, a request to select at least one matching specific data backup system from among the one or more matching specific data backup systems, wherein a list of the one or more matching specific data backup systems is displayed on the mobile device associated with the customer; and
      receiving, from the mobile device associated with the customer, a selection of the at least one selected matching specific data backup system;
  determining whether an expiration time of a customer support contract associated with the at least one selected matching specific data backup system is lower than a threshold value;
  in response to determining that the expiration time of the customer support contract associated with the at least one selected matching specific data backup system is lower than the threshold value, sending, to the mobile device associated with the customer, data associated with an option to renew the customer support contract associated with the at least one selected matching specific data backup system;
  otherwise, in response to determining that the expiration time of the customer support contract is equal to or exceeds the threshold value, determining whether a replacement or new hardware part associated with the at least one selected matching specific data backup system is available;
  in response to determining that the replacement or new hardware part associated with the at least one selected matching specific data backup system is available, sending, to the mobile device associated with the customer, data associated with an option to refresh the replacement or new hardware part associated with the at least one selected matching specific data backup system;
  creating a case profile associated with the request, wherein the case profile includes information included within the request, information associated with a user of the device, and information associated with the at least one selected matching specific data backup system;
  determining a support technician to be assigned to the request for customer support based at least on the geo-location data from the request for customer support, geo-location data of a mobile device associated with the support technician, and one or more other competencies of the support technician, wherein determining the support technician to be assigned includes obtaining a profile of the support technician and comparing the geo-location data from the request to the geo-location data of the mobile device associated with the support technician; and
  sending a message to the mobile device associated with the support technician to dispatch the support technician for the request for customer support if the geo-location data of the mobile device associated with the support technician is proximate to the geo-location data from the request.

12. A system for retrieving information associated with a request for support, comprising:
  a processor configured to:
    receive, from a mobile device associated with a customer, a request for customer support including geo-location data of the mobile device associated with the customer, an identifier of a user that sent the request, authentication information, and a current timestamp that are included automatically in the request, wherein the request was received from a device over a network, wherein the request includes a user configured language setting previously stored at the device, wherein the geo-location data is generated by the mobile device associated with the customer; and
    in response to the request, use the geo-location data from the request to retrieve information associated with the request, wherein to retrieve information includes to:
    determine whether corresponding geo-location data associated with one or more specific data backup systems located within one or more data centers of a customer site associated with the customer substantially matches the geo-location data from the request;
    in response to a determination that the corresponding geo-location data associated with the one or more specific data backup systems substantially matches with the geo-location data from the request,
      retrieve the information associated with the matching specific data backup system, the retrieved information including configuration information of the one or more matching specific data backup systems and a history of maintenance of the one or more matching specific data backup systems;
      send, to the mobile device associated with the customer, a request to select at least one matching specific data backup system from among the one or more matching specific data backup systems, wherein a list of the one or more matching specific data backup systems is displayed on the mobile device associated with the customer; and receive, from the mobile device associated with the customer, a selection of the at least one selected matching specific data backup system;

determine whether an expiration time of a customer support contract associated with the at least one selected matching specific data backup system is lower than a threshold value;

in response to determining that the expiration time of the customer support contract associated with the at least one selected matching specific data backup system is lower than the threshold value, send, to the mobile device associated with the customer, data associated with an option to renew the customer support contract associated with the at least one selected matching specific data backup system;

otherwise, in response to determining that the expiration time of the customer support contract is equal to or exceeds the threshold value, determine whether a replacement or new hardware part associated with the at least one selected matching specific data backup system is available;

in response to determining that the replacement or new hardware part associated with the at least one selected matching specific data backup system is available, send, to the mobile device associated with the customer, data associated with an option to refresh the replacement or new hardware part associated with the at least one selected matching specific data backup system;

create a case profile associated with the request, wherein the case profile includes information included within the request, information associated with a user of the device, and information associated with the at least one selected matching specific data backup system;

determine a support technician to be assigned to the request for customer support based at least on the geo-location data from the request for customer support, geo-location data of a mobile device associated with the support technician, and one or more other competencies of the support technician, wherein determine the support technician to be assigned includes obtain a profile of the support technician and compare the geo-location data from the request to the geo-location data of the mobile device associated with the support technician; and send a message to the support technician to dispatch the support technician for the request for customer support if the geo-location data of the mobile device associated with the support technician is proximate to the geo-location data from the request; and a memory coupled to the processor and configured to provide the processor with instructions.

13. The system of claim 12, wherein the request includes one or more of the following: data identifying a specific data backup system, a description of the problem with the specific data backup system, data identifying a customer site at which the specific data backup system is located, data identifying the mobile device, data identifying a user that sent the request, contact information associated with the user, and a timestamp.

14. The system of claim 12, wherein retrieved information associated with the request includes one or more of the following: data associated with the matching specific data backup system at a customer site, a configuration associated with the matching specific data backup system, an identifier associated with the customer site, and data associated with the customer support contract.

15. The system of claim 12, wherein to use the geo-location data to retrieve information includes comparing the geo-location data to each of a plurality of geo-location data corresponding to a plurality of specific data backup systems.

16. The system of claim 12, wherein prior to the determination of the support technician, the processor is further configured to search for a relevant solution document to be provided to the user.

17. The system of claim 12, wherein the customer support contract renewal data includes a price quote for each particular customer support contract renewal option.

18. The method of claim 1, wherein retrieving information includes:
determining that one or more matching specific data backup systems associated with the geo-location data are not found;
in response to determining that the one or more matching specific data backup systems is not found, sending a prompt to the device, wherein the prompt is configured to collect information associated with whether a specific data backup system has been moved.

19. The method of claim 18, further comprising:
receiving, from the device, information associated with whether a specific data backup system has been moved, wherein the information indicates that the specific data backup system has been moved;
determining that information associated with whether a specific data backup system has been moved indicates that the specific data backup system has moved;
in response to determining that the information associated with whether the specific data backup system has been moved indicates that the specific data backup system has moved,
sending, to the device, a list of specific data backup systems of record associated with the customer;
receiving, from the device, an indication of one or more of the specific data backup systems from the list of specific data backup systems of record that have been moved to a location corresponding to the geo-location data included in the request for customer support; and
updating records associated with the one or more specific data backup systems that have been moved to the location corresponding to the geo-location data included in the request for customer support.

20. The method of claim 1, wherein the one or more other competencies of the support technician include one or more of skills, language fluency, and hours of work.

* * * * *